July 12, 1938.  A. H. LAMB  2,123,470
CONTROL DEVICE
Filed May 10, 1934  2 Sheets-Sheet 1

Inventor:
Anthony H. Lamb,
By Potter, Pierce & Scheffler,
Attorneys.

| To turn Lights on at, Foot-C. | Set Lead B' to Contact | To turn Lights off at, Foot-C. | Set Lead A' to Contact |
|---|---|---|---|
| ½ | I | 1½ | I |
| 1 | II | 3 | II |
| 1½ | III | 4½ | III |
| 2 | IV | 6 | IV |
| 2½ | V | 7½ | V |

Inventor:
Anthony H. Lamb,
By Potter, Pierce & Scheffler,
Attorneys.

Patented July 12, 1938

2,123,470

UNITED STATES PATENT OFFICE 2,123,470

CONTROL DEVICE

Anthony H. Lamb, Elizabeth, N. J., assignor to Weston Electrical Instrument Corporation, Newark, N. J., a corporation of New Jersey Application May 10, 1934, Serial No. 725,017

26 Claims. (Cl. 250—41.5)

This invention relates to control devices of the type including a primary instrument or device and a relay energized thereby to control a machine or agency which affects a factor, such as temperature, illumination or the like, which determines the response or output of the primary instrument.

While not limited thereto, the invention will be described in connection with the automatic control of street lighting, but it may be applied to other fields where the control system should vary in sensitivity at different times or under different conditions. Some types of automatic temperature control systems for dwellings do include clock mechanism for changing the temperature control range to a lower value during the late night hours, but this change in the operating range is not accompanied by a change in the sensitivity of the control system. Regardless of the position of the timing mechanism, the thermostat and relay will cut off the heat at some temperature slightly above the point at which the supply of heat is initiated.

Photoelectric systems for controlling street lighting have been of this constant sensitivity type and, in general, have turned the lights off in the morning at an illumination value which was from 25% to 100% higher than the illumination value at which the lights were turned on. So far as illumination requirements are concerned, it is entirely practical to turn off the lights when the morning illumination is substantially less than that at which artificial lighting is necessary at night.

There are comparatively few people on the streets in the early morning hours and, furthermore, it is possible to distinguish objects clearly under relatively low illumination when the light is increasing in value. Although substantial economy will result from the use of a photoelectric control of street lighting which is more sensitive at sunrise than at sunset, the most highly developed control of the prior art provides equal sensitivity at morning and at night, i. e., the lights are turned off at the same value at which they were turned on the night before.

An object of the present invention is to provide a control device or system which exhibits a higher sensitivity in removing a given control condition than it did in imposing that control condition. A further object is to provide a control device including time-controlled mechanism for varying the sensitivity of the control device in a predetermined manner. A further object is to provide a photoelectric control device including mechanism, which preferably is adjustable, for obtaining a desired relationship between the illumination value at which a given control condition is established and the illumination value at which that control condition is removed. More specifically, an object is to provide a photoelectric control device including a photoelectric cell working into a control relay, and a time-control mechanism for connecting a shunt across the relay at predetermined intervals to reduce the sensitivity of the relay.

These and other objects and advantages of the invention will be apparent from the following specification when taken with the accompanying drawings in which.

Figure 1:
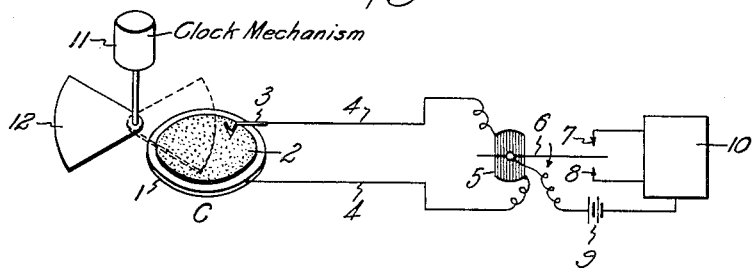
Figs. 1 to 3 are schematic diagrams of control devices embodying the invention.

In the drawings, the reference character C identifies a primary instrument or control device comprising a photoelectric cell of the current generating type which includes a back electrode 1, a layer 2 of actinoelectric material, such as crystalline solenium, and a collecting grid or electrode 3. The back electrode and collecting electrode are connected by leads 4 to the moving coil 5 of an electrical relay, and the coil carries a pointer or contact arm 6 which is movable between relatively fixed contacts 7, 8, in accordance with the magnitude of the current supplied to the relay by the cell C. A source of current 9 is connected to the contact arm 6 and the engagement of the contact arm with the contacts 7, 8 completes control circuits through a network, indicated generically by the block diagram 10, which may be of any desired design.

Control systems including the parts so far described are generally old and, in accordance with this invention, the sensitivity of such a control device is adjusted on a time basis by means of a clock mechanism 11 which rotates a vane 12, Fig. 1, to overlie a portion of the cell C at predetermined time intervals. As shown in solid lines, the vane 12 does not obstruct any portion of the cell and the contact arm 6 will therefore engage the contact 8 (when the relay is so designed that increasing current flow causes movement in the direction of the arrow) upon an increase in illumination to some predetermined and relatively low value. At some later time, the clock mechanism will move the vane 12 into the position shown in dotted lines and a portion of the cell will thereby be shielded. When this occurs, the contact arm 6 may move back to engage the "lower" contact 7 at an illumination value greater than that which previously resulted in the engagement of contact arm 6 with the "higher" contact 8. The significance of this arrangement is that the control device is less sensitive when the cell is partially shielded than it is when the entire area of the cell is exposed to the source of illumination.

Figure 2:
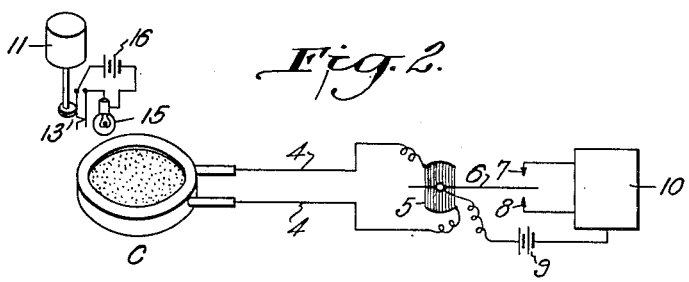

The change in the effective sensitivity of such a photoelectric control system may be varied by adding to, in place of decreasing, the current output of the cell. In the circuit of Fig. 2, the construction and circuit arrangement of the cell and relay may be substantially identical with that of Fig. 1. Similar reference numerals are applied to corresponding parts but the circuit will not be described in detail. The apparent sensitivity of the control device is increased at desired time intervals by the clock mechanism 11 which rotates a cam 13 to actuate a switch 14 in a circuit which includes a small electric light 15 and a current source 16. The lamp 15 does not provide sufficient illumination at the cell C to move contact arm 6 of the relay into engagement with the contact 8, but it supplements the illumination from an outside source, which may be solar illumination, and therefore a slight increase of illumination to some value less than that at which contact arm 6 engaged contact 7 will result in the closing of a circuit through the control network 10.

Figure 3:
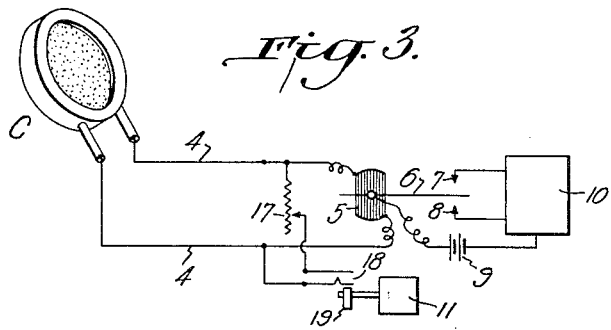

Another method of controlling the sensitivity of the control device includes an adjustment of the sensitivity of the relay element of the system. As shown in Fig. 3, the moving coil 5 of the relay is shunted by a circuit which includes a resistance 17, which may be adjustable, and a switch 18 which is controlled by a cam 19 driven by the clock mechanism 11.

As applied to a control of street lighting, the time control must be so designed that the increase in sensitivity takes place long after the lights are turned on by a decrease in the solar illumination to a fixed value, such as two foot candles. If this were not the case, the lights would be turned off after a short interval when the illumination fell to some lower value, such as one foot candle.

Figures 4, 5:
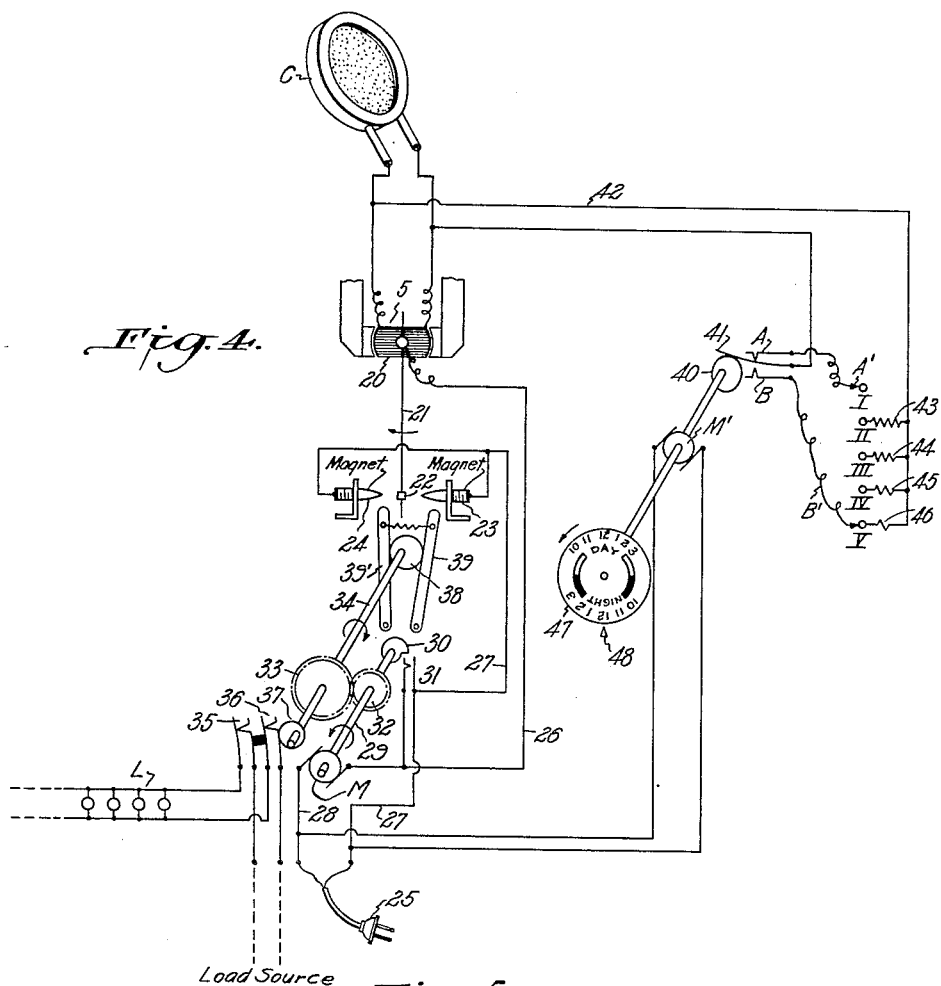
Fig. 4 is a more detailed circuit diagram of a control device of the general type shown in Fig. 3.
Fig. 5 is a tabulation or instruction sheet such as might be supplied with the control device of Fig. 4 to indicate the various ranges of sensitivity obtainable by different adjustments of the control system.

A complete street lighting control system is illustrated in Fig. 4, and includes highly sensitive relays of the type described and claimed in my copending applications, Ser. Nos. 688,695 and 688,696, filed Sept. 8, 1933. Relatively heavy currents may be controlled by sensitive relays by employing magnetic contact elements to obtain a reliable contact engagement, and then forcing the contact elements apart after the contact engagement has served its purpose. It is to be understood, however, that the present invention may be employed to obtain desired changes in the sensitivity of control systems in which the relay element is not of a highly sensitive instrument.

As shown in Fig. 4, the photoelectric cell C of the system is preferably arranged to face the northern sky at an angle of about 25° to the vertical. The cell is connected across the winding 20 of the moving system of a relay which includes a contact arm 21 carrying a soft iron rider 22 that cooperates with relatively fixed contacts 23, 24. The contacts 23, 24 are small permanent magnets, and the contacting surfaces of the rider 22 and the magnets may be coated with a gold or other metallic film of high electrical conductivity to insure reliable contact engagement. The contacts 23, 24 are connected to each other, and a closing of the contact rider 22 with either magnetic contact completes a circuit including the motor M and a source of power which is indicated by the electrical plug 25 that may be connected to the usual light and power line. This circuit may be traced through the lead 26 from one side of the motor to the contact arm 21, and lead 27 which connects the contacts 23, 24 to one contact of the terminal plug, the other plug contact being connected to the other motor terminal by a lead 28. The motor-driven shaft 29 carries a cam 30 for closing a switch 31 in parallel with the relay contacts, and a gear 32 which meshes with a gear 33 on a parallel shaft 34, the gear 33 being of twice the pitch diameter of gear 32. The street lighting circuit L is connected to a load source through the switches 35, 36 which are actuated by a cam 37 on a shaft 34 which is driven from the shaft 29 through a 1 to 2 reduction gearing 32, 33. An engagement of the pointer contact 22 with either of the magnetic contacts 23, 24 therefore results in one revolution of shaft 29 and a half-revolution of the shaft 34. The shaft 34 also carries a cam 38 for actuating the pusher arms 39, 39' that operate to break the instrument contact and to insure alternate engagements of the rider contact 22 with the magnetic contacts 23, 24, as described in my copending application Ser. No. 688,695. As shown in Fig. 4, the last contact engagement was with the magnet 24 and therefore the pusher arms 39, 39' are in such position as to permit engagement of contacts 22, 23, but not of contacts 22, 24.

Assuming that a decrease in current flow through winding 20 rotates the pointer clockwise, as indicated by the arrow, a decrease in illumination to that value which results in a closure of contacts 22, 24 will effect a half-revolution of shaft 34 and cam 38 to close the load switches 35, 36; and the succeeding half-revolution of shaft 34 and cam 38 to open the load switches takes place when contacts 22, 23 are closed. Some control of the critical illumination values may be made when the contacts 23, 24 are of known design such as, for example, the illustrated threaded rod style, which permits some adjustment of these relatively fixed elements, but no adjustment which can be made of the parts so far described will result in an opening of the lighting circuit at an illumination value lower than that at which the lighting circuit was closed the previous evening.

In accordance with this invention, the sensitivity of the control may be increased during the night hours by a timing mechanism, such as a clock motor M' that is energized from the plug 25, which rotates the cam 40 to control a switch in a resistive network. The switch blade or contact arm 41 is connected to one terminal of winding 20, and moves between contacts A, B that have flexible leads A', B', respectively, for connection to any of a series of contacts I, II, etc. The contact I is an open contact, i. e., there is an infinite resistance between it and the lead 42 which extends to the second terminal of winding 20, while contacts II, III, etc. are connected to lead 42 by a series of resistances, 43, 44, 45, 46, respectively, of progressively decreasing values. The clock mechanism includes a dial 47 carrying a double twelve-hour scale and legends indicating "Day" and "Night" for cooperation with a fixed mark 48. The cam 40 and dial 47 make one revolution, each twenty-four hours, and the cam is so shaped that the contact 41 is in engagement with the contacts A, B for alternating periods of about twelve hours each.

With the parts in the position shown in Fig. 4, the load switches 35, 36 are closed and the street lights are burning, the time is midnight, and the cam 40 has just completed a transfer of the contact arm 41 from the contact B to the contact A. This motion of the contact arm 41 affects the sensitivity of the control only when the leads A', B' are connected to different contacts of the shunting systems. By reference to the tabulation, Fig. 5, it will be seen that the relay pointer contact 22 will engage the magnetic contact 23 when the illumination at cell C rises to 1½ foot candles, since the lead A' engages the contact I and the relay is operating at maximum sensitivity. The time mechanism reduces the sensitivity at about noon when the reduced diameter portion of cam 40 permits contact arm 41 to engage the contact B. This action shunts the resistor 46 across the relay coil 20 and so reduces the sensitivity that the current output at 2½ foot candles at cell C results in an engagement of the contacts 22, 24. The resulting half-revolution of shaft 34 by motor M closes the switches 35, 36 to turn on the lighting system L.

The particular values stated in this description of operation may be varied, with the same relay and shunting network, by adjustment of the leads A', B' and by adjustments of the relatively fixed contacts 23, 24 of the relay. The Fig. 5 tabulation indicates the range of operating conditions which may be covered by adjusting the leads A', B', and by combining such adjustments of the shunting network with adjustments of the relay contacts 23, 24, it is possible to increase this range to effect operation at, for example, from 1 to 12½ foot candles illumination for turning off the lights and from ¼ to 5 foot candles for turning on the lights.

It will be apparent that the particular adjustment of the leads A', B' with respect to the contacts I, II, etc. may be such as to provide an increase, a decrease, or no change in sensitivity upon a given change in the position of the time controlled switch. Furthermore, there may be an increase in sensitivity whether or not the lights are turned off at an illumination value less than that which turned on the lights. If, for example, the lead A' is connected to contact II, and lead B' to contact IV, the lights will go on at a value of 2 foot candles and will be turned off at 3 foot candles, Fig. 5.

The invention is not limited to the particular uses herein stated or to the apparatus which has been illustrated and described, as various changes may be made without departing from the spirit of my invention as set forth in the following claims.

I claim:

1. In a photoelectric control system, photoelectric means having an electrical output varying as a function of the illumination at said means, an electrical relay responsive to the electrical output of said photoelectric means, a load circuit controlled by said relay, and time controlled means for altering the sensitivity of the response of said relay to changes in the illumination at said photoelectric means.

2. In a photoelectric control system, the combination with a control device including a photoelectric cell and an electrical relay energized by the output of said cell, of a load circuit having switch means controlled by said relay, and time-controlled means for regulating the sensitivity of said control device to changes in illumination.

3. A photoelectric control system as claimed in claim 2, wherein said time-controlled means comprises a clock-mechanism, and a vane actuated by said mechanism into a position to overlie a portion of said cell.

4. A photoelectric control system as claimed in claim 2, wherein said time-controlled means comprises a clock-mechanism, a light source for illuminating said cell to an extent less than that effective to result in actuation of said relay, and means controlled by said clock-mechanism for alternately energizing and de-energizing said light source.

5. A photoelectric control system as claimed in claim 2, wherein said relay includes a moving system including a winding connected across said cell; and said time-controlled means includes a circuit adapted to be shunted across said winding, switch means for opening and closing said shunt circuit, and clock mechanism for actuating said switch means.

6. In a photoelectric control system, the combination with a photoelectric cell, an electrical relay responsive to the output of said cell, said relay including a winding for actuating a contact arm alternatively into engagement with a pair of spaced and relatively fixed contacts, a lighting circuit, switch means for completing or interrupting said lighting circuit in accordance with the engagement of said contact arm with the respective contacts, and time-controlled means for adjusting the sensitivity of said relay.

7. A control system as claimed in claim 6, wherein said time-controlled means comprises a circuit adapted to be shunted across the relay winding to reduce the sensitivity of said relay, a switch in said circuit, and clock-mechanism for actuating said switch to render said shunt circuit alternatively operative and inoperative.

8. In a photoelectric system for controlling street illumination, a photoelectric cell, a relay energized by said cell and including a moving system having a winding for moving a contact arm between two spaced contacts in accordance with current flow through said winding, an illumination circuit including switch means, means actuated in response to an engagement of the relay contact arm with one contact to close said switch means and actuated in response to engagement of the contact arm with the other contact to open said switch means, and time-controlled means for controlling the sensitivity of said relay.

9. A control system as claimed in claim 8, wherein said time-controlled means includes a circuit adapted to be shunted across said relay winding to reduce the sensitivity of said relay, and clock-mechanism for connecting said shunt circuit across said winding at a time substantially later than that at which said switch means was opened and for disconnecting said shunt circuit at a time substantially later than that at which said switch means is closed to energize said illumination circuit.

10. In a photoelectric control system for street lighting, the combination with a photoelectric cell, a relay energized by said cell, an illumination circuit, and means actuated by said relay for energizing said illumination circuit when the solar illumination at said cell falls to a predetermined value and for opening said illumination circuit when the solar illumination at said cell increases to a critical value, of means for adjusting the sensitivity of the response of said relay to the current output of said cell, and timing mechanism controlling said adjusting means to set the said sensitivity to a higher value at sunrise than at sunset, whereby said critical value may be less than said predetermined value.

11. A photoelectric control system as claimed in claim 10, wherein said relay includes an operating winding connected across said cell; and the said adjusting means includes a resistive circuit shunted across said winding and including a switch, and said timing mechanism is a clock-mechanism for closing said switch during a daylight hour at which the solar illumination is normally relatively high and for opening said switch during a night hour substantially later than sunset.

12. A photoelectric control system as claimed in claim 10, wherein said relay includes an operating winding; and said adjusting means includes a switch contact arm connected to one terminal of said winding, a plurality of resistances having terminals in common and connected to the other terminal of said winding, a switch contact having a lead adapted to be connected to the second terminal of some one of said resistances, and timing mechanism engages said switch contact arm with said switch contact during a daylight hour and breaks said engagement during a night hour.

13. A photoelectric control system as claimed in claim 10, wherein said relay includes an operating winding; and said adjusting means includes a switch contact arm connected to one terminal of said winding, a plurality of resistances having terminals in common and connected to the other terminal of said winding, a pair of contacts, and a lead secured to each contact and each adapted to be connected with the second terminal of some one of said resistances; and said timing mechanism effects the engagement of said switch contact arm alternately with said contacts in daily cycles.

14. In a photoelectric control for a lighting circuit, the combination with relay means for turning the lighting circuit on and off, and photoelectric means for energizing said relay means, of means for setting said relay means for operation in two different ranges of illumination values in each of which said relay means will be energized by said photosensitive means to turn on said circuit at one value of illumination at the photoelectric means and to turn off said circuit at a higher value of the illumination at the photosensitive means, and time-controlled means for actuating said setting means to set said relay means for operation in one range of illumination values for a turn-on operation and for operation in the other range for a turn-off operation.

15. In a photoelectric control for a lighting circuit, the combination with relay means for turning the lighting circuit on and off, and photoelectric means for energizing said relay means, of means for setting said relay means for operation in two different ranges of illumination values in each of which said relay means will be energized by said photosensitive means to turn on said circuit at one value of illumination at the photoelectric means and to turn off said circuit at a higher value of the illumination at the photosensitive means, and time-controlled means for actuating said setting means to set said relay means for operation in the higher range of illumination values for a turn-on operation and for operation in the lower range for a turn-off operation.

16. Apparatus for controlling the artificial illumination in a region comprising a photoelectric device, a lighting system for illuminating the region, relay means actuated by said photoelectric device for turning said lighting system on and off, and control means operable at predetermined periodicity and independently of the illumination at the photoelectric device for adjusting said relay means to turn on said lighting system when the illumination at the photoelectric device reaches a preselected value and to turn off said lighting system at a different and lower preselected value.

17. Apparatus for controlling the artificial illumination in a region comprising a photoelectric device, a lighting system for illuminating the region, relay means actuated by said photoelectric device for turning said lighting system on and off, and time-actuated control means for adjusting said relay means to turn on said lighting system when the illumination at the photoelectric device reaches a preselected value and to turn off said lighting system at a different and lower preselected value.

18. In a photoelectric system for controlling artificial illumination, the combination with an illumination circuit, photosensitive means, and relay means actuated by said photosensitive means to open and to close said illumination circuit, of control means adjustable to alternate positions to set said relay means for response to a high or alternatively to a low range of natural illumination values at the photosensitive means, and timing means for periodically adjusting said control means to said alternate positions at a night and at a subsequent day hour.

19. In a photoelectric system for controlling artificial illumination, the combination with an illumination circuit, photosensitive means, and relay means actuated by said photosensitive means to open and to close said illumination circuit, of control means adjustable to alternate positions to set said relay means for response to a high or alternatively to a low range of natural illumination values at the photosensitive means, and timing means operable at a night hour to adjust said control means for a circuit-opening operation of said relay means at the low range of illumination values, said timing means being operable at a day hour to adjust said control means for a circuit-closing operation of said relay means at the high range of illumination values.

20. Photoelectric relay apparatus including a photoelectric device adapted to be subjected to the varying intensity of daylight, said apparatus being constructed to operate in one sense in response to a predetermined light value when the light is diminishing, means for causing the apparatus to operate in the opposite sense in response to a lower predetermined light value when the light is increasing and time controlled means for controlling the operation of said means.

21. Photoelectric relay apparatus including a photoelectric device adapted to be subjected to the varying intensity of daylight, said apparatus being constructed to operate in one sense in response to a predetermined light value when the light is diminishing, means for causing the apparatus to operate in the opposite sense in response to a lower predetermined light value when the light subsequently increases and time controlled means for rendering said means inoperative until a time corresponding to a daylight intensity that is less than said lower predetermined value.

22. Photoelectric relay apparatus for controlling a lighting circuit comprising a photoelectric device arranged to be affected by daylight, said apparatus being constructed to close said circuit when daylight decreases to a predetermined value, means for causing said apparatus to open said circuit when daylight in subsequently increasing reaches a lower predetermined value and means comprising a synchronous motor and a switch operated thereby for rendering said means incapable of functioning until such a time at which daylight should have decreased to a value below said lower predetermined value.

23. Photoelectric relay apparatus for controlling a lighting circuit comprising a photoelectric device adapted to be affected by daylight, said apparatus being constructed to close said circuit when daylight decreases to a predetermined value, means for causing said apparatus to open said circuit when daylight in subsequently increasing reaches a lower predetermined value and a timing device for rendering said means incapable of functioning until such a time at which the value of daylight should have decreased to a value below said lower predetermined value.

24. Photoelectric relay apparatus including a photoelectric device adapted to be subjected to the varying intensity of daylight, said apparatus being constructed to operate in one sense in response to a predetermined light value when the light is increasing, means for causing the apparatus to operate in the opposite sense in response to a higher predetermined light value when the light is decreasing and time controlled means for controlling the operation of said means.

25. Photoelectric relay apparatus including a photoelectric device adapted to be subjected to the varying intensity of daylight, said apparatus being constructed to operate in one sense in response to a predetermined light value when the light is increasing, means for causing the apparatus to operate in the opposite sense in response to a higher predetermined light value when the light subsequently decreases and time controlled means for rendering said means inoperative until a time corresponding to a daylight intensity that is greater than said higher predetermined value.

26. Photoelectric relay apparatus for controlling a lighting circuit comprising a photoelectric device adapted to be affected by daylight, said apparatus being constructed to open said circuit when daylight increases to a predetermined value, means for causing said apparatus to close said circuit when daylight in subsequently decreasing reaches a higher predetermined value and a timing device for rendering said means incapable of functioning until such a time at which the value of daylight should have increased to a value above said higher predetermined value.

ANTHONY H. LAMB.